(12) United States Patent
Nakagawa et al.

(10) Patent No.: US 7,393,146 B2
(45) Date of Patent: Jul. 1, 2008

(54) OPTICAL MODULE

(75) Inventors: Kakushi Nakagawa, Yamanashi (JP); Kazuyoshi Watanabe, Yamanashi (JP)

(73) Assignee: Eudyna Devices Inc., Nakakoma-gun (JP)

( * ) Notice: Subject to any disclaimer, the term of this patent is extended or adjusted under 35 U.S.C. 154(b) by 0 days.

(21) Appl. No.: 11/520,714

(22) Filed: Sep. 14, 2006

(65) Prior Publication Data
US 2007/0077013 A1 Apr. 5, 2007

(30) Foreign Application Priority Data
Sep. 30, 2005 (JP) ............................. 2005-288895

(51) Int. Cl.
*G02B 6/36* (2006.01)
(52) U.S. Cl. ............................................ 385/92; 385/88
(58) Field of Classification Search ............... 385/88–94
See application file for complete search history.

(56) References Cited

U.S. PATENT DOCUMENTS 4,904,046 A * 2/1990 Paschke et al. ............... 385/138

6,435,736 B1 8/2002 Irie et al. ....................... 385/92
7,194,150 B2 * 3/2007 Sakane et al. .................. 385/1

FOREIGN PATENT DOCUMENTS

CN 2550783 Y 5/2003
JP 2001-100066 4/2001

OTHER PUBLICATIONS

Chinese Office Action dated Oct. 19, 2007 with English Translation.

* cited by examiner

*Primary Examiner*—Sarah Song
(74) *Attorney, Agent, or Firm*—Kratz, Quintos & Hanson, LLP

(57) ABSTRACT

An optical module has a package, a first fixing portion, a second fixing portion, and two attachment portions. The package has an optical fiber passing through a sidewall thereof. The first fixing portion fixes the optical fiber to the sidewall of the package directly or indirectly through an intermediate member. The second fixing portion fixes the optical fiber inside of the package. The two attachment portions are arranged respectively at two opposing corners of the package or at two sides of the package around the corners. A distance between the first fixing portion and the second fixing portion is less than 6 mm.

11 Claims, 9 Drawing Sheets

OPTICAL MODULE

BACKGROUND OF THE INVENTION

1. Field of the Invention

This invention generally relates to an optical module, and in particular, relates to an optical module coupled to an optical fiber.

2. Description of the Related Art

Recently, an optical module, in which an emitting element such as a laser diode or a receiving element such as photodiode is coupled to an optical fiber, is used in such as an optical communication.

A description will be given of an optical module used conventionally in accordance with a first conventional embodiment with reference to FIG. 1A and FIG. 1B. FIG. 1A illustrates a top view of the optical module in accordance with the conventional embodiment (a cap is not shown). FIG. 1B illustrates a cross sectional view taken along a line A-A of FIG. 1A. A package 20 is fixed to a board used for a heat sink 10, with a screw 27 at a flange 26 as an attachment portion. The heat sink 10 is, for example, composed of Cu or Al. The package 20 has a sidewall 22 and a bottom 24. The bottom 24 is formed with the flange 26 integrally. The sidewall 22 and the bottom 24 are, for example, composed of a KOVAR (trade name) which is Fe—Ni—Co alloy. There is provided the flange 26 at each of the four corners of the bottom 24. An opening 23 is formed at a face of the sidewall 22. An optical fiber 12 is inserted into the package 20. That is, the optical fiber 12 passes through the sidewall 22 of the package 20. The optical fiber 12 is fixed at the sidewall 22 with a first fixing portion 14.

One end of the optical fiber 12 is fixed inside of the package 20 with a second fixing portion 16 having a fixing member 40 and an optical fiber support portion 42. A lens 32 supported with a lens holder 34 and a laser diode 30 arranged on a submount 44 are on an optical axis of the optical fiber 12. The optical fiber 12 is coupled optically to the laser diode 30. The fixing member 40 and the submount 44 are fixed on a base 46. The submount 44 is fixed on a thermo module 48, Thermo Electric cooler (TEC), for keeping temperature constant. The thermo module 48 is fixed on the bottom 24. The optical fiber 12 is fixed to the first fixing portion 14 and a second fixing portion 16. In this case, a distance L is defined as a distance between an edge part of the first fixing portion 14 fixing the optical fiber 12 and an edge part of the second fixing portion 16 fixing the optical fiber 12. The lens holder 34 may be fixed on the base 46, although the lens holder 34 is fixed on the submount 44 in FIG. 1A and FIG. 1B.

The optical fiber 12 is subjected to a stress caused by differentials between linear thermal expansion coefficients of the heat sink 10, the package 20 and the optical fiber 12 (hereinafter, referred to a thermal stress), because the optical module is subjected to an environmental temperature range −40° C. to 85° C. Japanese laid-open Patent Publication No. 2001-100066 (hereinafter, referred to Document 1) discloses that reliability may be degraded because the optical fiber 12 is broken or the optical fiber 12 falls from the fixing portion because of the thermal stress. Document 1 discloses an art (a second conventional embodiment) where the optical fiber 12 has a bending in order to restrain the breaking of the optical fiber 12 or the fall of the second fixing portion 16 fixing the optical fiber 12 from the base 46. FIG. 2 illustrates a cross sectional view of an optical module in accordance with the second conventional embodiment. The same components and configurations as those of FIG. 1A have the same reference numerals and a detailed explanation will be omitted. As shown in FIG. 2, the optical fiber 12 has a bending between the first fixing portion 14 and the second fixing portion 16. In this case, a curvature radius of the optical fiber 12 is referred to r.

In the optical module in accordance with the first conventional embodiment, adding to the above reliability degradation caused by the thermal stress, a decline of an optical coupling ration between the optical fiber 12 and the laser diode 30 also occurs, arising from a change of a relative position between the optical fiber 12 and the laser diode 30 because of the thermal stress. In this case, it is not possible to secure the quality of the optical module. On the other hand, there is a following problem when it is tried to secure the reliability and the quality with a method in accordance with the second conventional embodiment. It is necessary that the curvature radius r of the optical fiber is more than 30 mm, because of an optical or mechanical limitation (30 mm means a limited curvature radius). Therefore, it is necessary to lengthen the distance L between the first fixing portion 14 and the second fixing portion 16, in order to keep the curvature radius of the optical fiber less than 30 mm in the temperature range of the optical module −40° C. to 85° C. It is difficult to downsize the optical module when it is tried to secure the reliability and the quality.

SUMMARY OF THE INVENTION

The present invention provides a small optical module securing the reliability and the quality.

According to an aspect of the present invention, preferably, there is provided an optical module including a package, a first fixing portion, a second fixing portion, and two attachment portions. The package has an optical fiber passing through a sidewall thereof. The first fixing portion fixes the optical fiber to the sidewall of the package directly or indirectly through an intermediate member. The second fixing portion fixes the optical fiber inside of the package. The two attachment portions are arranged respectively at two opposing corners of the package or at two sides of the package around the corners. A distance between the first fixing portion and the second fixing portion is less than 6 mm.

With the above-mentioned configuration, it is possible to reduce a thermal stress given to the optical fiber. And it is possible to secure reliability and a quality of the optical module and to downsize the optical module.

According to another aspect of the present invention, preferably, there is provided an optical module including a package, a first fixing portion, a second fixing portion and two attachment portions. The package has an optical fiber passing through a sidewall thereof. The first fixing portion fixes the optical fiber to the sidewall of the package directly or indirectly through an intermediate member. The second fixing portion fixes the optical fiber inside of the package. The two attachment portions are arranged respectively at two sides of a bottom of the package opposing each other substantially in parallel with an inserting direction of the optical fiber. A distance between the first fixing portion and the second fixing portion is less than 6 mm.

With the above-mentioned configuration, it is possible to reduce a thermal stress given to the optical fiber. And it is possible to secure reliability and a quality of the optical module and to downsize the optical module.

According to another aspect of the present invention, preferably, there is provided an optical module including a package, a first fixing portion, a second fixing portion and a buffer. The package has an optical fiber passing through a sidewall thereof. The first fixing portion fixes the optical fiber. The second fixing portion fixes the optical fiber inside of the package. The buffer is fixed to the sidewall and extends to between an inner side of the sidewall and the second fixing portion. The first fixing portion fixes the optical fiber to the buffer directly or in directly through an intermediate member. A distance between the first fixing portion and the second fixing portion is less than 6 mm.

With the above-mentioned configuration, it is possible to reduce a thermal stress given to the optical fiber. And it is possible to secure reliability and a quality of the optical module and to downsize the optical module.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

First Embodiment

Figure 3A:
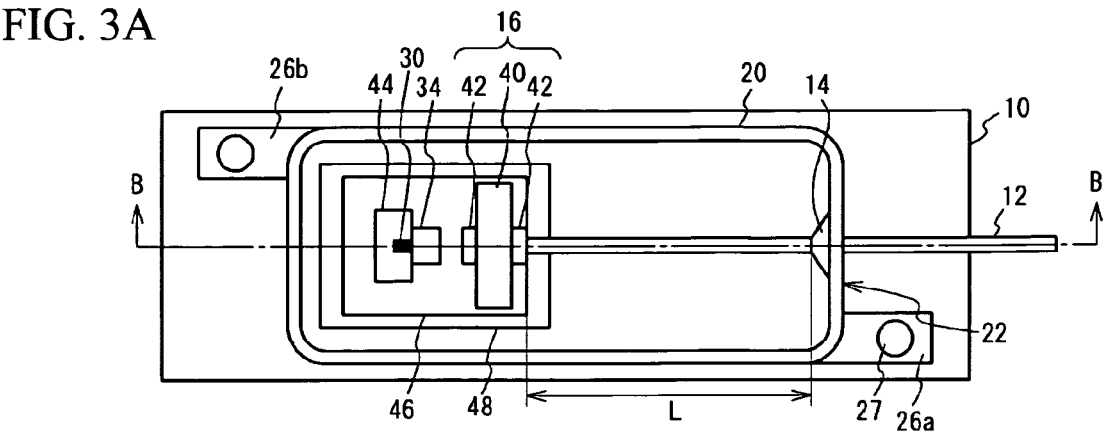
FIG. 3A illustrates a top view of an optical module in accordance with a first embodiment.
Figure 3B:
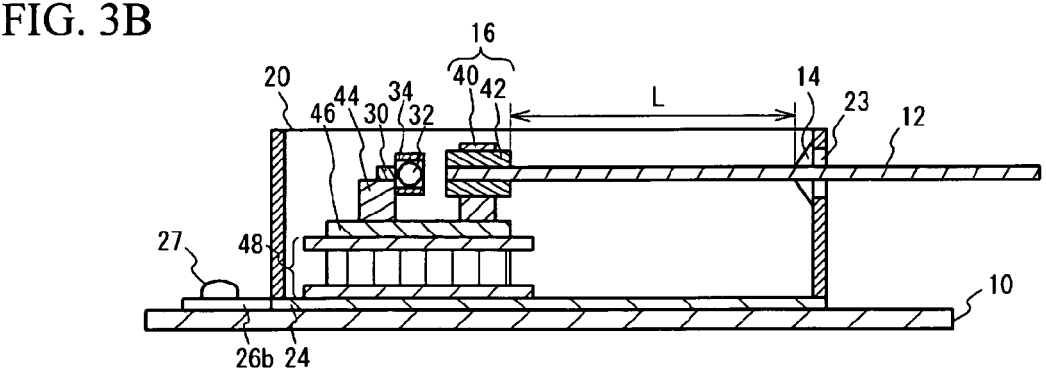
FIG. 3B illustrates a cross sectional view taken along a line B-B of FIG. 3A.
Figure 3C:
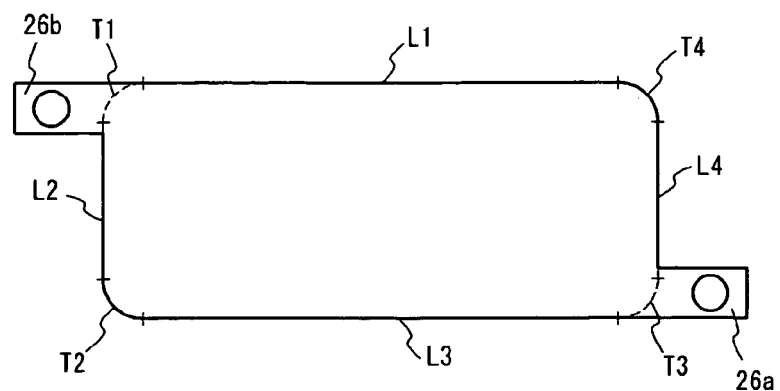
FIG. 3C illustrates a plane view of a bottom of a package and flanges.

An optical module in accordance with a first embodiment has a structure in which flanges are arranged at opposing corners of a bottom of a package, the flange being used for attaching the package to a heat sink. FIG. 3A illustrates a top view of the optical module in accordance with the first embodiment (a cap is not shown). FIG. 3B illustrates a cross sectional view taken along a line B-B of FIG. 3A. FIG. 3C illustrates a plane view of the bottom 24 of the package 20 and flanges 26a and 26b. The structure of the first embodiment is different from that of the first conventional embodiment in a point that the flange 26a is arranged at one corner of the bottom of the package 20 and the flange 26b is arranged at the opposing corner. The structure of the first embodiment is as same as that of the first conventional embodiment in other points. The same components and configurations as those of the first conventional embodiment have the same reference numerals and a detailed explanation will be omitted. As shown in FIG. 3C, the bottom 24 of the package 20 and the flanges 26a and 26b are formed integrally. The bottom of the package 20 has four sides L1 through L4 and four corners T1 through T4. Here, each of the corners L1 through L4 forms a curve portion between the sides. The flange 26a is formed at the corner T3 and the flange 26b is formed at the corner T1 opposing to the corner T3, on the bottom of the package. The flanges 26a and 26b are formed in a direction substantially in parallel with an inserting direction of the optical fiber 12.

The following is a description that will be given of a method of manufacturing the optical module in accordance with the first embodiment. At first, the laser diode 30 and the lens holder 34 housing the lens 32 are fixed to the submount 44. Next, the submount 44 is fixed to the base 46. The base 46 is fixed on the thermo module 48 fixed on the bottom 24 of the package 20. The fixing member 40 is arranged on the base. The optical fiber support portion 42 as a ferrule is fixed to the optical fiber 12. A front edge of the optical fiber 12 is inserted into the fixing member 40 through the opening 23 formed at the sidewall 22 of the package 20. The fixing member 40, the optical fiber support portion 42 and the optical fiber 12 are arranged and fixed so that a desirable optical coupling is obtained between the optical fiber 12 and the laser diode 30. Accordingly, the optical fiber 12 is fixed to the second fixing portion 16. The optical fiber 12 is fixed to the sidewall 22 with the first fixing portion 14 composed of such as glass. A cap (not shown) is provided on the package 20. The package 20 is sealed with the cap. A solder and so on may be used for the first fixing portion 14, if it is possible to fix the optical fiber 12 to the opening 23 of the sidewall 22 of the package 20 with the solder. After that, the optical module in accordance with the first embodiment is attached to the heat sink 10 with the flanges 26a and 26b.

Here, the submount 44, the base 46, the fixing member 40 and the optical fiber support portion 42 are, for example, composed of a metal such as a KOVAR, a ceramics or the like. These components are fixed with an adhesive bond, a solder, a YAG welding or the like. An adhesive bond, a solder or the like is used when the optical fiber 12 is fixed to the second fixing portion 16.

A description will be given of a reason why the optical module in accordance with the first embodiment is capable of securing the reliability and the quality. A linear thermal expansion coefficient of the optical fiber 12 is 0.55μ/° C. Generally, the linear thermal expansion coefficient of the KOVAR, $Al_2O_3$ (alumina), CuW or the like used for the sidewall 22 and the bottom 24 of the package 20 is approximately 8μ/° C. The linear thermal expansion coefficient of Al, Cu or the like used for the heat sink 10 is approximately 20μ/° C. The linear thermal expansion coefficients of the heat sink 10, the package 20 and the optical fiber 12 are widely different from each other. In the optical module in accordance with the first embodiment, the bottom 24 forming a bottom face of the package 20 is attached to the heat sink 10 with the flanges 26a and 26b, where the heat sink 10 has a linear thermal expansion coefficient higher than that of the bottom 24 of the package 20. For example, as mentioned above, in the optical module in accordance with the first conventional embodiment, all the four corners of the bottom 24 of the package 20 are fixed to the heat sink 10 with each of the flanges 26. When the optical module gets higher temperature, the four corners of the bottom 24 are thermally stresses based on a differential between the linear thermal expansion coefficients of the heat sink 10 and the package 20. Then, the package 20 would expand longer over the range of the expansion length expected from the thermal expansion coefficient thereof. As a result, the optical fiber 12 is thermally stressed so as to extend in the inserting direction thereof, because the linear thermal expansion coefficient of the optical fiber 12 is much less than those of the heat sink 10 and the package 20.

In the optical module in accordance with the first embodiment, the corners T1 and T3 of the bottom 24 of the package 20 fixed to the heat sink 10 are stressed when the temperature of the optical module gets higher, because the flanges 26*a* and 26*b* are arranged at the bottom 24 of the package 20. The package 20 extends in a direction passing through the corners T1 and T3, because the corners T2 and T4 are not fixed. Therefore, a part of the optical fiber 12 around a center of the side L4 is thermally stressed in an oblique direction, that is, in a direction not in parallel with the inserting direction of the optical fiber 12. In the first conventional embodiment, the optical fiber 12 is stressed in the inserting direction. In contrast, the optical fiber 12 is stressed in the oblique direction, in the first embodiment. In the first embodiment, it is therefore possible to reduce the thermal stress induced in the inserting direction of the optical fiber 12, in comparison with the first conventional embodiment. Similarly, it is possible to reduce the thermal stress to which the optical fiber 12 is subjected in the inserting direction thereof, in a case where the optical module gets low temperature. A degradation of the reliability and the quality are generally caused by the thermal stress induced in the inserting direction of the optical fiber 12, where the degradation of the reliability is caused by such as the breaking of the optical fiber 12 or the fall of the optical fiber 12 from the fixing portion, and the degradation of the quality being caused by a reduction of an optical coupling ratio between the optical fiber 12 and the laser diode 30. However, it is possible to restrain the degradation of the reliability and the quality caused by the thermal stress induced in the inserting direction of the optical fiber 12 and is possible to secure the reliability and the quality, because the thermal stress is reduced in this embodiment.

Next, a description will be given of a limitation of the distance L between the first fixing portion 14 and the second fixing portion 16 in a case where the optical fiber 12 has a bending as well as the second conventional embodiment. In this case, a maximum environmental temperature, to which the optical module is subjected, is Tmax (85° C.). There is no bending in the optical fiber 12. The thermal expansion coefficient of the optical fiber 12 negligibly small compared to those of materials of the heat sink 10 and the package 20. And it is supposed that there is no change in the length of the optical fiber 12 caused by temperature change within a range Tmax to Tmin. When the temperature is changed to Tmin (−40° C.), a relationship between the curvature radius r of a bending generated in the optical fiber 12 and the distance L is given in a following equation.

$$2 \times (2\pi r) \times \sin^{-1}(L/2r)/360° = L \times (\alpha \times (Tmax - Tmin) + 1)$$

Here, α is the linear thermal expansion coefficient of the heat sink 10.

It is possible to select a material composing the heat sink 10 and is possible to attach the package to the heat sink 10. It is preferable that Al is used for the heat sink 10, because Al has a maximum linear thermal expansion coefficient in the materials generally used for the heat sink. A description will be given of a case where Al having the maximum linear thermal expansion coefficient α (23.6μ/° C.) in the materials generally used for the heat sink 10 is used. In this case, it is necessary that the distance L is more than 8 mm, when the curvature radius r of the bending of the optical fiber 12 is more than 30 mm as a limited curvature radius mentioned above. That is, it is necessary that the distance L is more than 8 mm, when the curvature radius r of the optical fiber 12 caused by the bending of the optical fiber 12 is more than 30 mm in the temperature range −40° C. to 85° C. Further, it is necessary that the distance L is more than 10 mm, when a margin is considered with the manufacturing.

The downsizing of the optical module is prevented, when the lower limitation of the distance L is determined. There is needed a skilled control in the manufacturing, when the optical fiber 12 has a bending. That is, it is necessary to manufacture the optical module so that the optical fiber 12 has a bending enough to absorb the thermal stress and the curvature radius of the bending is not more than the limited curvature radius. In this case, there is needed an assembling operation using manufacturing equipments or tools which is difficult to automate.

It is possible to secure the reliability and the quality even if the distance L between the first fixing portion 14 and the second fixing portion 16 is less than 10 mm, because it is possible to reduce the thermal stress to which the optical fiber 12 is subjected in the inserting direction thereof in the first embodiment. Conventionally, it is difficult that the optical fiber 12 has a bending, when the distance L is less than 6 mm. However, it is possible to secure the reliability and the quality and to downsize the optical module in the first embodiment, even if the distance L is less than 6 mm. In addition, there is not needed a skilled control as in the case of the second conventional embodiment, in a case where the optical fiber 12 has a bending. It is preferable that the distance L is less than 5 mm, and it is more preferable that the distance L is less than 4 mm.

Figure 4A:
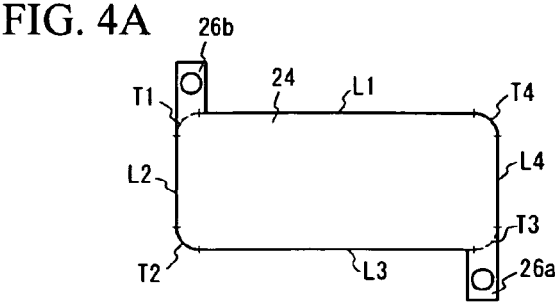
FIG. 4A through FIG. 4H illustrate other examples of a bottom of a package and flanges.

FIG. 4A through FIG. 4G illustrate examples of the bottom 24 of the package 20 and the flanges 26*a* and 26*b*. The same components and configurations as those of FIG. 3C have the same reference numerals. In FIG. 4A, the flange 26*a* is formed at the corner T3, and the flange 26*b* is formed at the corner T1. The flanges 26*a* and 26*b* extend in a direction substantially vertical to the inserting direction of the optical fiber 12.

Figure 4E:
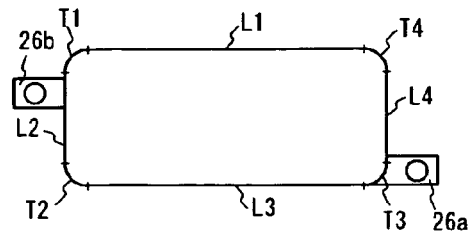
Figure 4B:
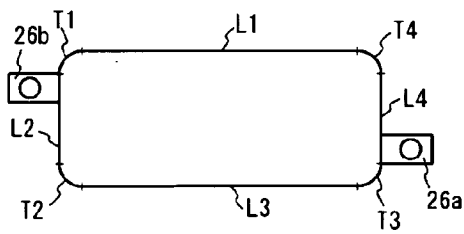

In FIG. 4B, the flange 26*a* is arranged to be in contact with the corner T3, and the flange 26*b* is arranged to be in contact with the corner T1, the corners T1 and T3 forming opposing corners of the bottom of the package 20. The flange 26*a* is formed on the side of the bottom around the corner T3 and the flange 26*b* is formed on the opposing side around the corner T1, the sides extending in a direction substantially vertical to the inserting direction of the optical fiber 12.

Figure 4F:
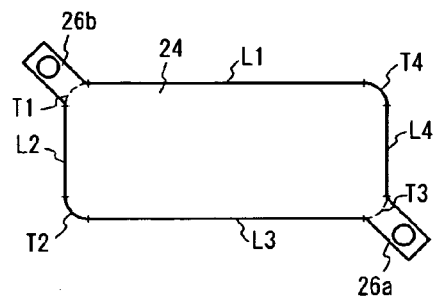
Figure 4C:
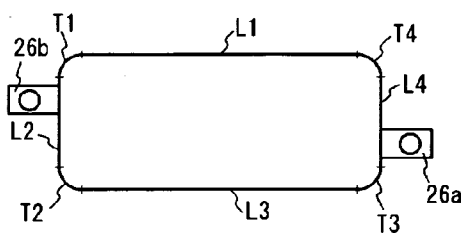

In FIG. 4C, the flange 26*a* is formed on the side of the bottom of the package 20 around the corner T3 and the flange 26*b* is formed on the opposing side around the corner T1, the sides extending in the direction substantially vertical to the inserting direction of the optical fiber 12.

Figure 4G:
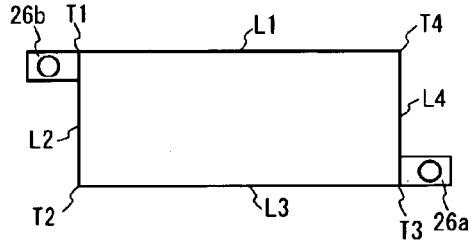
Figure 4D:
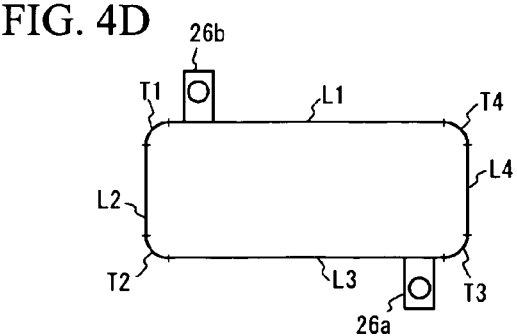

In FIG. 4D, the flange 26*a* is formed on the side of the bottom of the package 20 around the corner T3 and the flange 26*b* is formed on the opposing side around the corner T1, the sides extending in the direction substantially in parallel with the inserting direction of the optical fiber 12.

In FIG. 4E, the flange 26*a* is formed at the corner T3 and the flange 26*b* is formed on the side L2 around the corner T1.

In FIG. 4F, the flange 26*a* is formed at the corner T3 and the flange 26*b* is formed at the corner T1, the flanges 26*a* and 26*b* extending not in parallel with the inserting direction of the optical fiber 12.

Figure 4H:
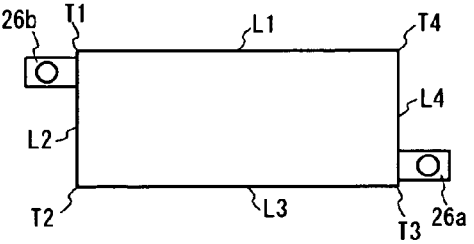

FIG. 4G and FIG. 4H illustrate a case where the corners T1 through T4 form apexes of a rectangle forming the bottom of the package 20. In FIG. 4G, the flange 26a is arranged to be in contact with the corner T3 and the flange 26b is arranged to be in contact with the corner T1, where the corners T1 and T3 are forming opposing corners of the bottom of the package 20. The flange 26a is formed on the side of the bottom around the corner T3 and the flange 26b is formed on the opposing side around the corner T1, the sides extending in the direction substantially vertical to the inserting direction of the optical fiber 12.

In FIG. 4H, the flanges 26a is formed at the corner T3 and the flange 26b is formed at the corner T1, where the corners T1 and T3 are forming opposing corners of the bottom of the package 20. And the flange 26a is formed at one side of the bottom of the package 20 and the flange 26b is formed at the other side, where the sides extend in the direction substantially vertical to the inserting direction of the optical fiber 12.

As shown in the examples, the thermal stress is given to the optical fiber 12 in an oblique direction. Therefore, the thermal stress in the inserting direction of the optical fiber 12 is reduced, compared to the first conventional embodiment. And it is possible to secure the reliability and the quality of the optical module and to downsize the optical module. The flange 26a may be arranged at corner T3 side relative to a center of the side L4 and the flange 26b may be arranged at corner T1 side relative to a center of the side L2, in a case where the flange 26a is formed on the side L4 around the corner T3 and the flange 26b is formed on the side L2 around corner T1. In this case, the optical fiber 12 is subjected to the thermal stress in the oblique direction. And it is possible to reduce the thermal stress in the inserting direction of the optical fiber 12, compared to the first conventional embodiment. It is preferable that the flange 26a is closer to the corner T3 and the flange 26b is closer to the corner T1, in order to obtain the effect sufficiently. The flange 26a may be formed on the corner T4 or around the corner T4 and the flange 26b may be formed on the corner T2 or around the corner T2, although the flange 26a may be formed on the corner T3 or around the corner T3 and the flange 26b may be formed on the corner T1 or around the corner T1 in the first embodiment.

Second Embodiment

Figure 5A:
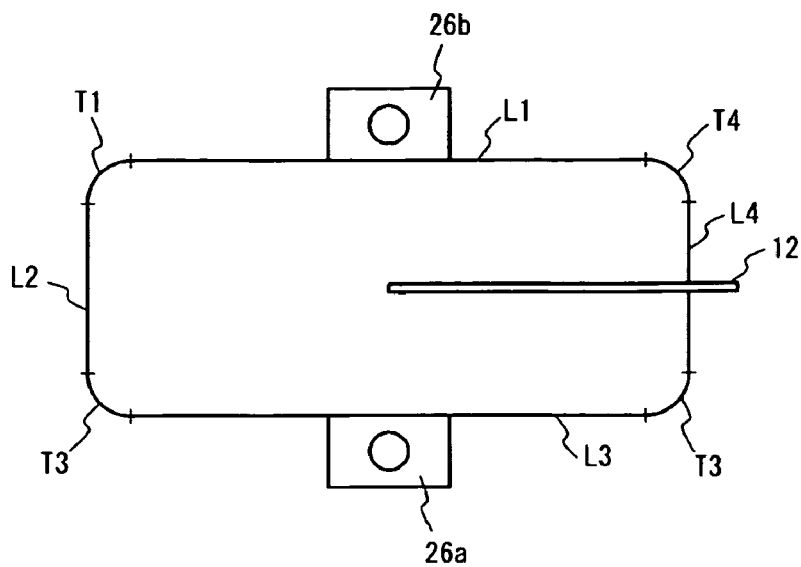
FIG. 5A through FIG. 5C illustrate a bottom of a package and flanges in accordance with a second embodiment and other examples.
Figure 5B:
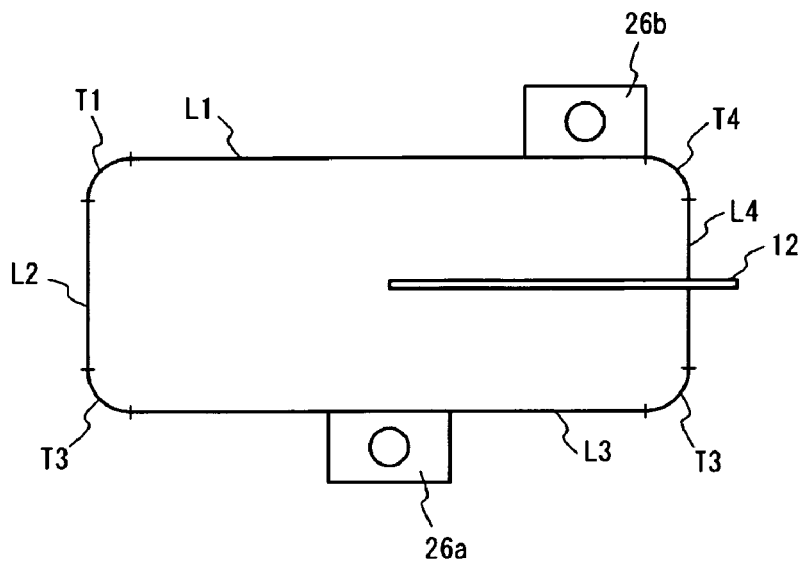
Figure 5C:
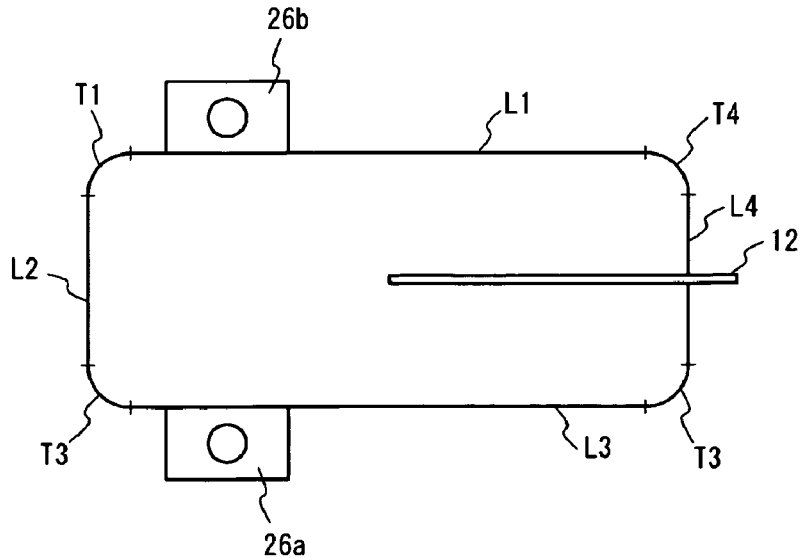

The optical module in accordance with a second embodiment has a structure in which the flanges for fixing the package to the heat sink are formed on the sides opposing each other in a direction substantially in parallel with the inserting direction of the optical fiber at the bottom of the package. A second embodiment shown in FIG. 5A through FIG. 5C is as same as the first embodiment besides in arrangement positions of the flange 26a and 26b. A detailed explanation is omitted. FIG. 5A through FIG. 5C illustrate the bottom 24 of the package 20 and the flanges 26a and 26b in accordance with the second embodiment and other examples. In FIG. 5A, the flange 26a is formed at the center of the side L3 and the flange 26b is formed at the center of the side L1, the sides L1 and L3 opposing substantially in parallel with the inserting direction of the optical fiber 12 at the bottom of the package 20.

In FIG. 5B, the flange 26a is formed on the side L3 and the flange 26b is formed on the side L1, the sides L1 and L3 opposing substantially in parallel with the inserting direction of the optical fiber 12 at the bottom of the package 20. The flange 26a is at the center of the side L3 and the flange 26b is in contact with the corner T4.

In FIG. 5C, the flange 26a is formed on the side L3 and the flange 26b is formed on the side L1, the sides L1 and L3 opposing substantially in parallel with the inserting direction of the optical fiber 12 at the bottom of the package 20. The flanges 26a and 26b are arranged to be opposing symmetrically each other with respect to the inserting direction of the optical fiber 12.

In the second embodiment, the package 20 is fixed to the heat sink 10 with the flanges 26a and 26b formed on the sides L1 and L3. The optical fiber 12 is subjected to a stress in the direction substantially vertical to the inserting direction thereof, when the temperature of the optical module increases. The thermal stress, to which the optical fiber 12 is subjected in the inserting direction thereof, is reduced, because the package 20 tends to expand in the direction substantially vertical to the inserting direction of the optical fiber 12. Therefore, it is possible to secure the reliability and the quality and to downsize the optical module as well as the first embodiment.

The optical fiber 12 is subjected to little thermal stress in the inserting direction thereof, particular in a case where the flanges 26a and 26b are arranged to be opposing with respect to the inserting direction of the optical fiber 12 as shown in FIG. 5A and FIG. 5C. It is therefore possible to secure the reliability and the quality further, and to downsize the optical module further.

Third Embodiment

Figure 1A:
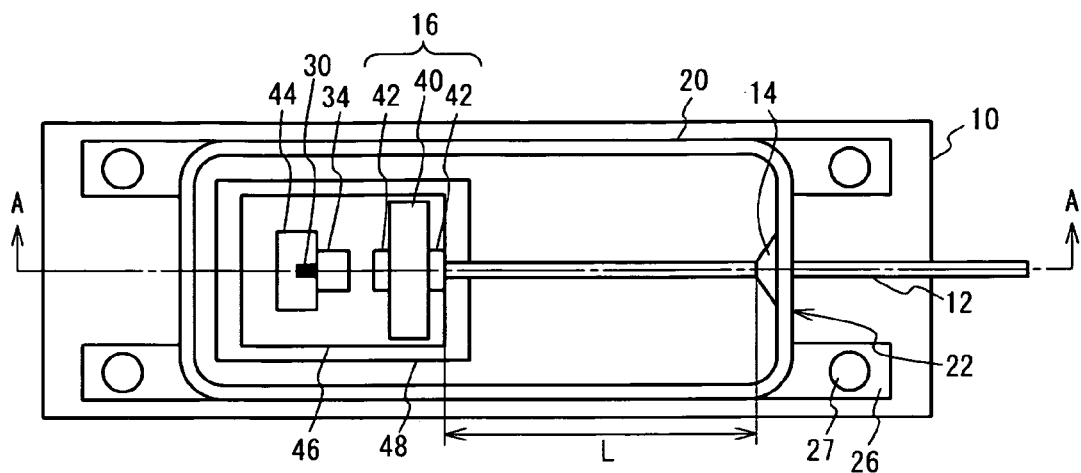
FIG. 1A illustrates a top view of an optical module in accordance with a first conventional embodiment.
Figure 1B:
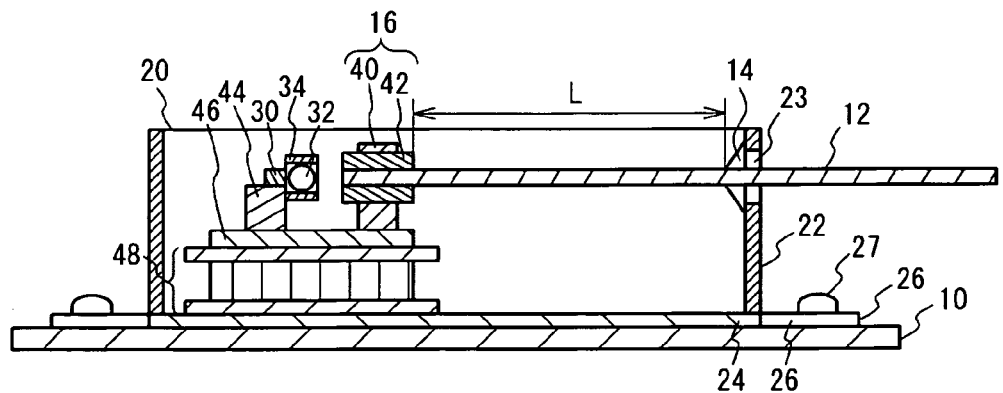
FIG. 1B illustrates a cross sectional view taken along a line A-A of FIG. 1A.
Figure 2:
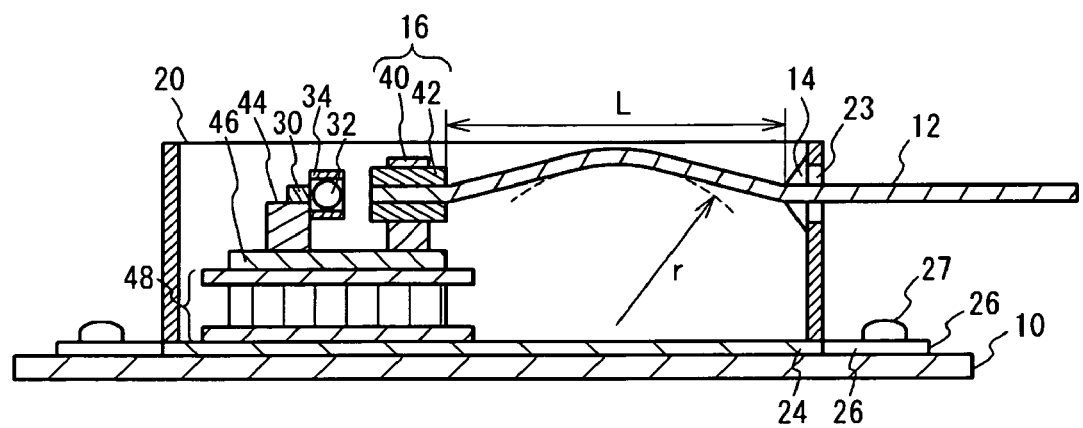
FIG. 2 illustrates a cross sectional view of an optical module in accordance with a second conventional embodiment.
Figure 6A:
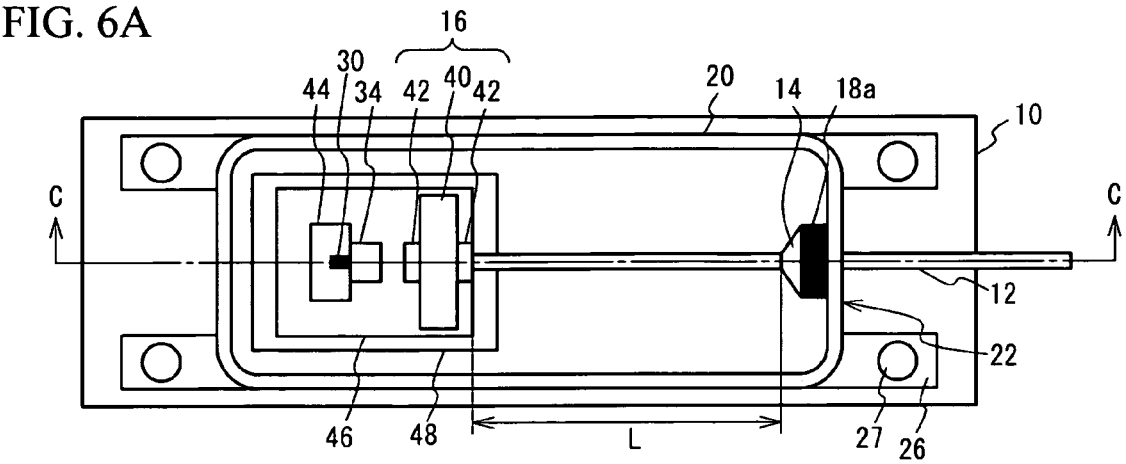
FIG. 6A illustrates a top view of an optical module in accordance with a third embodiment.
Figure 6B:
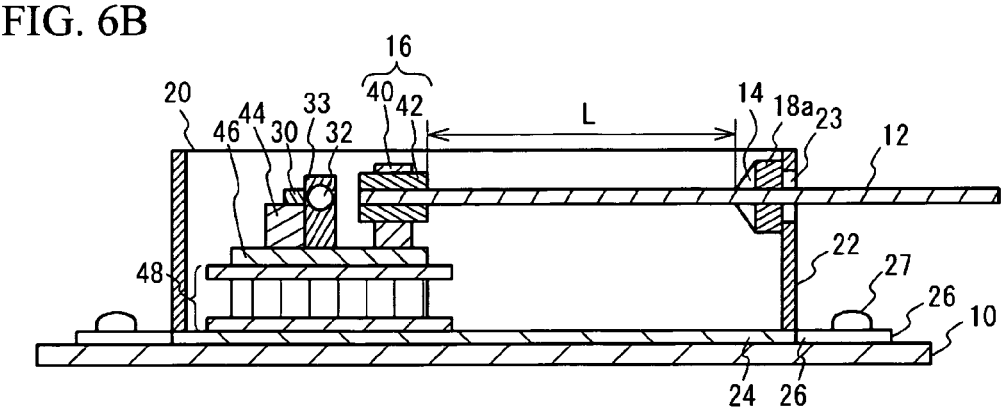
FIG. 6B illustrates a cross sectional view taken along a line C-C of FIG. 6A.

In a third embodiment, a buffer is provided between the sidewall and the first fixing portion. FIG. 6A illustrates a top view of an optical module in accordance with the third embodiment (a cap is not shown). FIG. 6B illustrates a cross sectional view taken along a line C-C of FIG. 6A. A buffer 18a is provided between the sidewall 22 and the first fixing portion 14, being different from FIG. 1A and FIG. 1B in accordance with the first conventional embodiment. A lens holder 33 housing the lens 32 is fixed to the base 46 directly. The lens holder 33 may be arranged on the submount 44 as well as the first embodiment. The structure of the third embodiment is as same as that of the first embodiment in other points. The same components and configurations as those of the first embodiment have the same reference numerals and a detailed explanation will be omitted. As shown in FIG. 6A and FIG. 6B, the buffer 18a is provided between the inside of the sidewall 22 and the first fixing portion 14, and is fixed to the sidewall 22, projecting toward inside of the sidewall 22. The first fixing portion 14 is arranged between the sidewall 22 and the second fixing portion 16, and is fixed to the sidewall 22 through the buffer 18a. That is, the buffer 18a is connected to the sidewall 22 and extends to between the sidewall 22 and the second fixing portion 16. The optical fiber 12 is fixed to the sidewall 22 through the buffer 18a and the first fixing portion 14. The buffer 18a projects toward inside of the sidewall 22 of the package 20. The thermal stress given to the optical fiber 12 is reduced when a projecting part of the buffer 18a expands or contracts based on the temperature change.

It is preferable that a material used for the buffer 18a has a linear thermal expansion coefficient higher than that of the bottom 24 of the package 20. The buffer 18a is, for example, composed of such as a SUS 304 of Fe—Cr—Ni alloy or a SUS 430 of Fe—Cr alloy. The sidewall 22 and the bottom 24 of the package 20 expand and the distance between the sidewall 22 and the second fixing portion 16 is increased, when the temperature of the optical module is increased. However, the buffer 18a between the first fixing portion 14 and the sidewall 22 expands. And the expansion length of the distance between the first fixing portion 14 and the second fixing portion 16 is a differential between the expansion lengths of the package 20 and the buffer 18a. It is possible to reduce the thermal stress given to the optical fiber 12, compared to the first conventional embodiment.

In addition, it is possible to further reduce the thermal stress given to the optical fiber 12, when the linear thermal expansion coefficient of the buffer 18a is higher than that of the bottom 24 of the package 20.

Further, it is possible to secure the reliability and the quality and to downsize the optical module, when the distance L between the first fixing portion 14 and the second fixing portion 16 is less than 6 mm.

Fourth Embodiment

Figure 7:
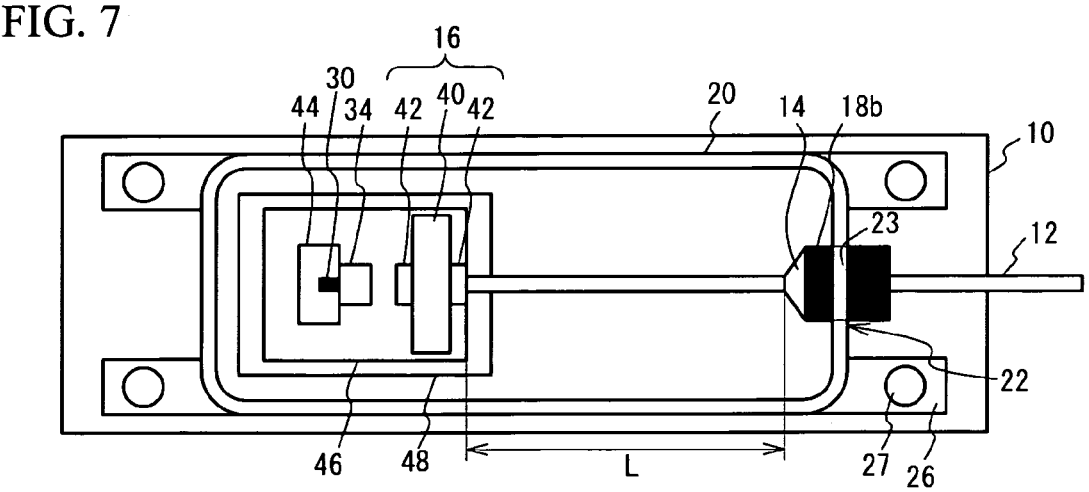
FIG. 7 illustrates a top view of an optical module in accordance with a fourth embodiment.

FIG. 7 illustrates a top view of an optical module in accordance with a fourth embodiment (a cap is not shown and the opening 23 is seen through and is illustrated with a thin line). The fourth embodiment is different from the third embodiment in a point that a buffer 18b is provided from the inside to the outside of the sidewall 22, passing through the opening 23 of the sidewall 22 where the optical fiver 12 passes through. The fourth embodiment is as same as the third embodiment in other points. The same components and configurations as those of the third embodiment have the same reference numerals and a detailed explanation will be omitted. It is possible to arrange the buffer 18b easily, by connecting the buffer 18b to the sidewall 22 through the sidewall 22.

Fifth Embodiment

Figure 8:
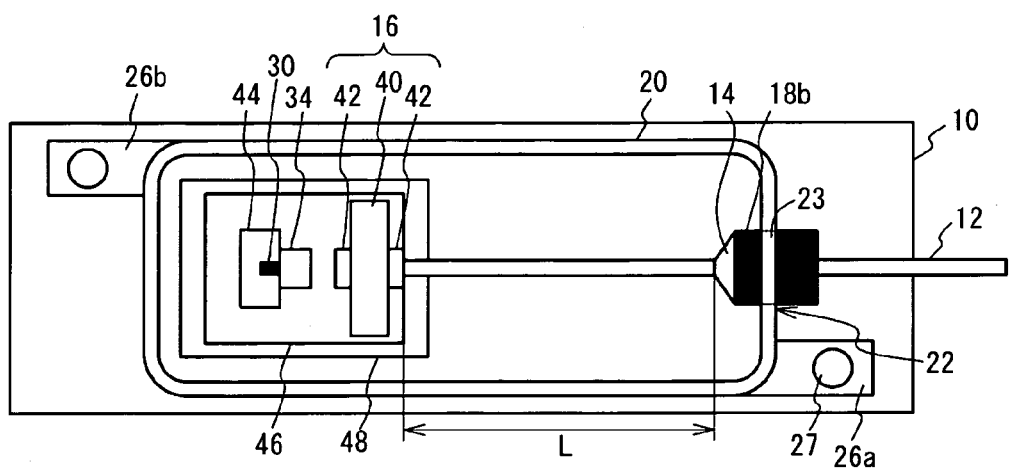
FIG. 8 illustrates a top view of an optical module in accordance with a fifth embodiment.

FIG. 8 illustrates a top view of an optical module in accordance with a fifth embodiment (a cap is not shown, the opening 23 is seen through and is illustrated with a thin line). The fifth embodiment is different from the fourth embodiment in a point that the flanges 26a and 26b are arranged as well as the first embodiment. The fifth embodiment is as same as the fourth embodiment in other points. The same components and configurations as those of the fourth embodiment have the same reference numerals and a detailed explanation will be omitted. The buffers 18a and 18b may be arranged as well as the third embodiment and the fourth embodiment. The flanges 26a and 26b may be arranged as well as the first embodiment, the second embodiment and the other examples of these. It is thus possible to further reduce the thermal stress given to the optical fiber 12, is possible to secure the reliability and the quality further, and is possible to downside the optical module further.

A material having a linear thermal expansion coefficient higher than that of the bottom 24 of the package 20 is used for the heat sink 10 as well as the first embodiment, in the third embodiment through the fifth embodiment. That is, the package 20 has the flanges 26a and 26b, and is attached to the heat sink 10 with the flanges 26a and 26b, the heat sink 10 having a linear expansion coefficient higher than that of the bottom 24 forming the bottom of the package 20.

Sixth Embodiment

Figure 9:
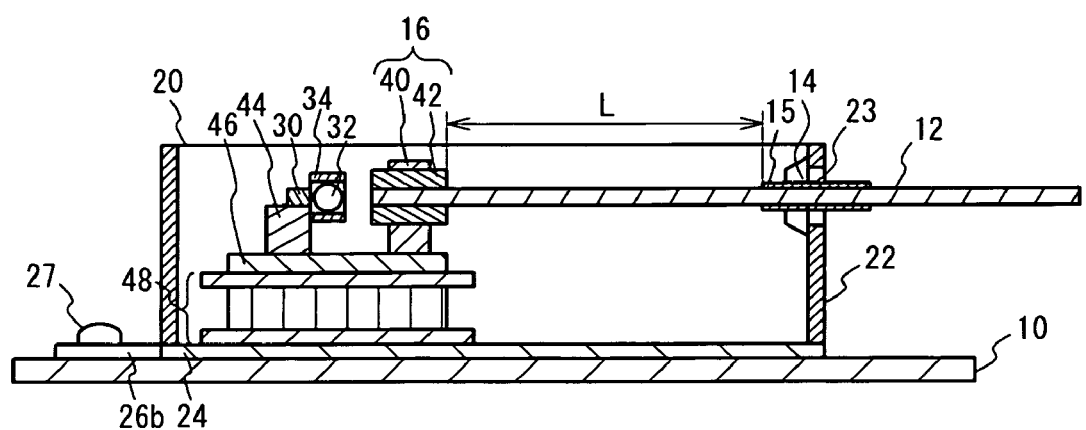
FIG. 9 illustrates a top view of an optical module in accordance with a sixth embodiment.

FIG. 9 illustrates a cross sectional view of an optical module in accordance with a sixth embodiment. The sixth embodiment is different from the first embodiment in a point that the first fixing portion 14 fixes the optical fiber 12 indirectly to the package 20 with an intermediate member 15 such as a ferrule. The optical fiber support portion 42 is used for an intermediate member of the second fixing portion 16 in the first embodiment through the fifth embodiment. The intermediate member may be composed of a metal, a ceramics, a resin or the like. The sixth embodiment is as same as the fifth embodiment in other points. The same components and configurations as those of the first embodiment have the same reference numerals and a detailed explanation will be omitted. In the first embodiment through the fifth embodiment and the other examples of these, the first fixing portion 14 and the second fixing portion 16 may fix the optical fiber 12 to the package 20 directly, or at least either of the first fixing portion 14 and the second fixing portion 16 may fix the optical fiber 12 to the package 20 indirectly through the intermediate member 15 or the optical fiber support portion 42. As shown in FIG. 9, the distance L is a length of a part that is not fixed with the intermediate member 15 or the optical fiber support portion 42 between the first fixing portion 14 and the second fixing portion 16, when the optical fiber 12 is fixed indirectly through the intermediate member 15 or the optical fiber support portion 42.

The first embodiment through the sixth embodiment and the examples of these may be a semiconductor element such as a photo diode or a light emitting diode, although a structure in which the laser diode 30 is optically coupled with the optical fiber 12. That is, the optical module may have a semiconductor element optically coupled with the optical fiber inside of the package.

The flanges 26a and 26b may be composed of a material different from the bottom 24 of the package 20, although the flanges 26a and 26b are formed with the bottom 24 of the package 20 integrally in the first embodiment through the sixth embodiment and the examples of these.

While the above description constitutes the preferred embodiments of the present invention, it will be appreciated that the invention is susceptible of modification, variation and change without departing from the proper scope and fair meaning of the accompanying claims.

The present invention is based on Japanese Patent Application No. 2005-288895 filed on Sep. 30, 2005, the entire disclosure of which is hereby incorporated by reference.

What is claimed is:

1. An optical module comprising:
a package having an optical fiber passing through a sidewall thereof;
a first fixing portion that fixes the optical fiber to the sidewall of the package directly or indirectly through an intermediate member;
a second fixing portion that fixes the optical fiber inside of the package; and
exactly two attachment portions that are arranged respectively at two opposing corners of the package or at two sides of the package around the corners,
wherein a distance between the first fixing portion and the second fixing portion is less than 6 mm.

2. The optical module as claimed in claim 1, wherein:
the two attachment portions are arranged respectively at the two sides around the corners of the package; and
the two sides are opposing each other substantially in parallel with an inserting direction of the optical fiber.

3. The optical module as claimed in claim 1, wherein:
the two attachment portions are arranged respectively at the two sides around the corners of the package; and
the two sides opposes each other substantially vertical to an inserting direction of the optical fiber.

4. The optical module as claimed in claim 1, further comprising a buffer that is connected to the sidewall and extends to between the sidewall and the second fixing portion,
wherein the first fixing portion is fixed to the sidewall through the buffer portion.

5. The optical portion as claimed in claim 1, wherein the package is attached to a board with the two attachment portions,
the board having a linear thermal expansion coefficient higher than that of a bottom of the package.

6. The optical module as claimed in claim 1 further comprising an optical semiconductor element that is optically coupled with the optical fiber inside of the package.

7. An optical module comprising:
a package having an optical fiber passing through a sidewall thereof;
a first fixing portion that fixes the optical fiber to the sidewall of the package directly or indirectly through an intermediate member,
a second fixing portion that fixes the optical fiber inside of the package; and
exactly two attachment portions that are arranged respectively at two sides of a bottom of the package opposing each other substantially in parallel with an inserting direction of the optical fiber,
wherein a distance between the first fixing portion and the second fixing portion is less than 6 mm.

8. The optical module as claimed in claim 7, wherein the two attachment portions are arranged to be symmetrically opposing each other with respect to an inserting direction of the optical fiber.

9. An optical module comprising:
a package having an optical fiber passing through a sidewall thereof;
a first fixing portion that fixes the optical fiber;
a second fixing portion that fixes the optical fiber inside of the package; and
a buffer that is fixed to the sidewall and extends to between an inner side of the sidewall and the second fixing portion,
wherein the first fixing portion fixes the optical fiber to the buffer directly or in directly through an intermediate member;
a distance between the first fixing portion and the second fixing portion is less than 6 mm; and
wherein the buffer portion has a thermal expansion coefficient higher than that of a bottom of the package.

10. The optical module as claimed in claim 9, wherein the buffer passes through the side wall and is connected to the sidewall.

11. The optical module as claimed in claim 9, wherein the package has an attachment portion and is attached to a board with the attachment portion, the board having a linear thermal expansion coefficient higher than that of a bottom of the package.

* * * * *